US010974916B2

(12) United States Patent
Turle

(10) Patent No.: US 10,974,916 B2
(45) Date of Patent: Apr. 13, 2021

(54) DOSING UNIT FOR AUTOMATIC WEIGHING SYSTEMS

(71) Applicant: Color Service S.r.l., Dueville (IT)

(72) Inventor: Antonello Turle, Breganze (IT)

(73) Assignee: COLOR SERVICE S.R.L., Dueville (IT)

( * ) Notice: Subject to any disclaimer, the term of this patent is extended or adjusted under 35 U.S.C. 154(b) by 0 days.

(21) Appl. No.: 16/864,561

(22) Filed: May 1, 2020

(65) Prior Publication Data
US 2020/0361725 A1  Nov. 19, 2020

(30) Foreign Application Priority Data

May 3, 2019 (IT) .......................... 102019000006531

(51) Int. Cl.
B65G 65/46 (2006.01)
B65G 53/46 (2006.01)
B65G 65/48 (2006.01)

(52) U.S. Cl.
CPC ......... B65G 65/463 (2013.01); B65G 53/465 (2013.01); B65G 65/4836 (2013.01)

(58) Field of Classification Search
USPC ................ 414/310, 311, 808, 811; 406/130; 222/241, 367
See application file for complete search history.

(56) References Cited

U.S. PATENT DOCUMENTS

| 1,545,230 | A | * | 7/1925 | Bernert | B65G 33/14 406/60 |
| 3,342,355 | A | * | 9/1967 | Lasiter | B65G 65/46 414/523 |
| 3,485,183 | A | * | 12/1969 | Floehr | B61D 7/22 105/282.1 |
| 3,509,828 | A | * | 5/1970 | Fritz | B61D 7/20 105/282.1 |
| 3,602,394 | A | * | 8/1971 | McCune | B65D 88/68 222/43 |

(Continued)

FOREIGN PATENT DOCUMENTS

| CN | 109552902 | 4/2019 |
| DE | 3043540 | 6/1982 |

(Continued)

OTHER PUBLICATIONS

Search Report for IT 102019000006531 dated Jan. 13, 2020 (7 pages).

Primary Examiner — Joseph A Dillon, Jr.
(74) Attorney, Agent, or Firm — Tutunjian & Bitetto, P.C.

(57) ABSTRACT

A dosing unit, for the controlled delivery of a solid material, including a silo, for containing the material to be delivered, having on the bottom a discharge mouth, said discharge mouth being circular, at least one extraction auger arranged inside said silo and operable in rotation around a vertical axis, at least one scraper member, located inside said silo and associated with said discharge mouth operable in rotation around said vertical axis, first actuation means of the extraction auger and second actuation means of the scraper member, at least one shutter component positioned below the discharge mouth, and moving means operatively connected to the shutter component to move it with respect to the discharge mouth.

15 Claims, 5 Drawing Sheets

(56) References Cited

U.S. PATENT DOCUMENTS

| | | | | |
|---|---|---|---|---|
| 4,252,299 A | * | 2/1981 | Lobue | F27B 1/21 137/240 |
| 4,821,782 A | * | 4/1989 | Hyer | B65B 37/00 141/255 |
| 4,957,404 A | * | 9/1990 | Lepley | B01F 7/00066 222/228 |
| 4,974,751 A | * | 12/1990 | King | A47F 1/03 222/134 |
| 4,975,013 A | * | 12/1990 | Lepley | B01F 7/00066 414/324 |
| 5,080,264 A | * | 1/1992 | Limper | B01F 7/00708 222/241 |
| 5,327,947 A | * | 7/1994 | McGregor | B65B 1/08 100/145 |
| 5,638,160 A | * | 6/1997 | Vollenbroek | B65G 65/463 399/258 |
| 5,655,692 A | * | 8/1997 | Navin | B65G 65/463 222/413 |
| 6,237,309 B1 | * | 5/2001 | DeMarco | B65B 1/12 141/231 |
| 6,237,815 B1 | * | 5/2001 | Schlosser | B65B 39/004 222/241 |
| 6,502,689 B2 | * | 1/2003 | Mitchell | B65G 19/14 198/550.8 |
| 9,458,585 B2 | * | 10/2016 | Phelps | B65D 88/66 |
| 9,950,856 B2 | * | 4/2018 | Stefanelli | B65D 83/00 |
| 10,358,296 B2 | * | 7/2019 | Guymon | B65G 33/14 |
| 2003/0155382 A1 | * | 8/2003 | Schlosser | B65B 1/12 222/413 |
| 2008/0099310 A1 | * | 5/2008 | Olds | B65G 33/20 198/671 |
| 2017/0334655 A1 | * | 11/2017 | Nichol | B65G 33/08 |

FOREIGN PATENT DOCUMENTS

| | | |
|---|---|---|
| EP | 1072537 | 1/2001 |
| FR | 2702746 | 9/1994 |

* cited by examiner

DOSING UNIT FOR AUTOMATIC WEIGHING SYSTEMS

TECHNICAL FIELD OF THE INVENTION

The present invention relates to a dosing unit for the controlled delivery of a product, which can used in automatic weighing systems. This product is then used for obtaining a pre-dosed mixture according to a specific recipe.

STATE OF THE ART

Nowadays, dosing groups are known arranged to deliver a product in a controlled way to supply a specific amount of the same inside a suitable container.

In particular, with reference to the field of the dosage of granular or powder products, it is known to have in sealable bags mixtures containing pre-dosed quantities of products, for example polymers, elastomers or additives, according to pre-established recipes, so as to render the mixture as ready to be used.

These systems, in general, can include a plurality of dosing units placed in succession along a weighing line of the automatic system. Consequently, the container, in which the suitably dosed product is to be located, is, from time to time, moved with respect to the individual dosing units.

Each dosing unit can comprise a tank or silo containing the product to be delivered through a discharge mouth of the tank itself, to which an extraction auger operable in rotation is operatively associated.

Following the actuation of the auger by means of a specific electric gearmotor unit, the product to be delivered is continuously picked up from the tank and moved towards the discharge mouth, through which it comes out to be deposited in a suitable container.

Product delivery continues until a predetermined weight quantity is reached.

However, it should be noted that following the deactivation of the gearmotor unit, a part of the product is still delivered due to the inertia of the drive system, which does not allow for timely locking of the rotation members.

In processes where it is necessary to deliver a specific amount of product, it is essential to be able to control extremely precisely the delivering process.

In addition, it is noted that factors such as repeatability and the time required to deliver the predetermined quantity of product are also aspects of considerable importance.

If different materials need to be dispensed, such as powder products with various particle size, granules, flakes, etc., it is necessary to provide multiple dosing units, each appropriately configured to ensure an optimal delivery of a specific type of product.

If a recipe comprising several products is to be made, it is necessary to provide for the presence of numerous dosing devices, which are different from each other.

Such a system is not very flexible to use, since it is difficult to be adapted for delivering different mixtures.

In fact, in order to modify the recipe of a mixture, one should change from time to time the configuration of the individual dosage units or their order along the weighing system, thereby actually requiring long downtimes.

There is a need in the field to have a dosing unit of a flexible use that can guarantee high performance regardless of the type of product to be delivered and the mixture to be obtained.

Furthermore, such a dosing unit should ensure a high production rate even within the framework of a solution that ensures extremely precise delivery of the pre-established quantity of product.

SUMMARY OF THE INVENTION

The main purpose of the invention is to improve the state of the art relating to a dosing unit to be used in an automatic weighing system.

Within the scope of this purpose, it is an object of the invention to provide a dosing unit capable of automatically, quickly and accurately delivering a predetermined quantity of solid product, regardless of the shape and consistency of the solid product itself.

Another object of the invention is to provide a dosing unit that is easy to be used and easily implementable in a pre-existing automatic weighing line.

A further object of the invention is to provide a dosing unit capable of ensuring high delivering flow rates, substantially independently from the characteristics of the product to be delivered.

Another object of the present invention is to provide a dosing unit which guarantees energy savings compared to traditional dosing units.

According to an aspect of the invention, a dosing unit, which can be used in automatic weighing systems, is provided according to the present application.

The present application refers to preferred and advantageous embodiments of the invention.

BRIEF DESCRIPTION OF THE DRAWINGS

Further characteristics and advantages of the present invention will become clearer from the detailed description of a preferred, non-exclusive embodiment of a dosing unit, illustrated only by way of indicative, but non-limitative example in the accompanying drawings, wherein.

DETAILED DESCRIPTION OF THE INVENTION

Figure 1:
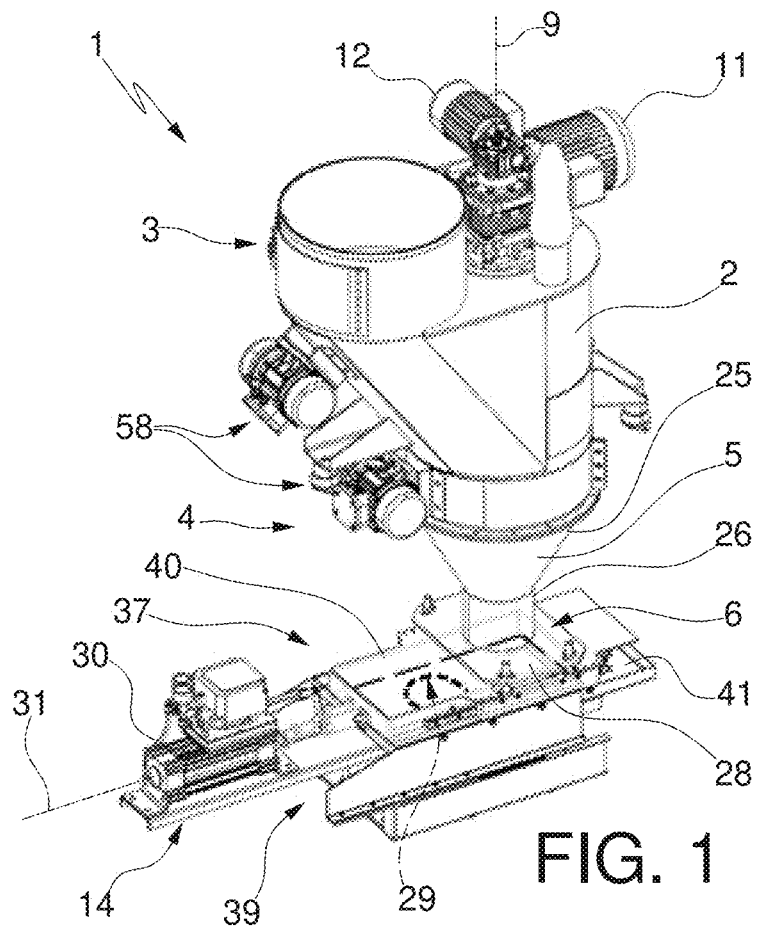
FIG. 1 is a perspective view taken from above of a dosing unit according to the invention.

With reference to the attached figures, a dosing unit, intended for the controlled delivery of a specific quantity by weight of a solid material, is generally indicated with the reference number 1.

The dosing unit 1 according to the invention makes it possible to deliver solid materials in automatic weighing systems, particularly for the preparation of recipes comprising a plurality of materials different in shape and consistency one with respect to the other.

By way of example, the dosing unit 1 can be used for the controlled delivery of materials such as powders, flours, granules, flakes, spheres, etc.

In this regard, the dosing unit 1 can be operatively connected to at least one device for supplying containers in which to dispense, in a controlled way, the material according to a predetermined dosage, and to automatic weighing means to detect the quantity of material delivered inside each of these containers. These further devices are not illustrated in the attached figures as they do not constitute the subject of the present invention.

The weighing system, not shown in the attached figures, can comprise several dosing units 1 according to the present invention, placed in succession with each other along a line of advancement of the container. In this case, the individual dosing units 1 make it possible to delivery respective materials within the same container, so as to obtain a mixture corresponding to a predetermined recipe at the exit of the weighing system.

The dosing unit comprises at least one silo 2 for containing the material to be delivered.

The silo 2 develops in a vertical direction.

The silo 2 has an upper portion 3, through which the product to be dosed can be introduced into the dosing unit 1, and a lower portion 4 for the discharge of the material to be delivered.

The lower portion 4 is shaped like a hopper 5, to convey the product to be delivered stored inside the silo 2 towards a free lower end 6.

The free lower end 6 delimits an outlet mouth 7 which arrives at the outside of the dosing unit 1.

The free lower end 6 is cylindrically or substantially cylindrically shaped and, thus the discharge mouth 7 is circular or substantially circular.

The material to be delivered is discharged through the discharge mouth 7, in a per se known manner, inside a container operatively associable with weighing means.

The container, which together with the weighing means is not shown in the attached figures, can then be positioned, always automatically and with transfer means not shown in the figures, at another dosing unit 1 suitable for delivering a different material, according to specific needs.

The dosing unit comprises at least one extraction auger 8 arranged inside the silo 2.

Figure 3:
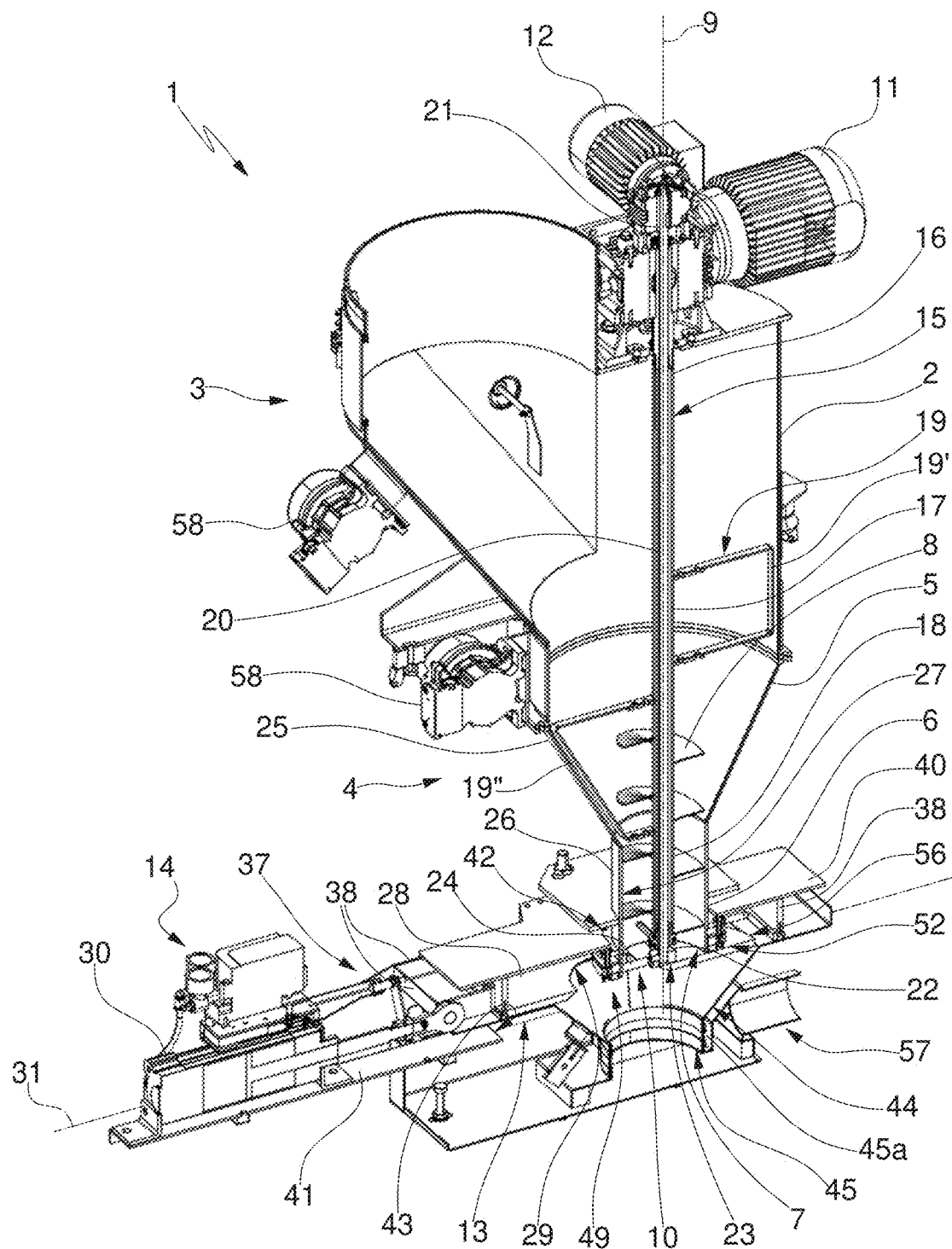
FIG. 3 is a section view taken along the side section plane of the dosing unit of FIG. 1.

The extraction auger 8 is operable in rotation around a vertical axis 9, for causing the material to advance through the silo 2, bringing it near the discharge mouth 7 (see the section view of FIG. 3).

The dosing unit 1 comprises at least one scraper member 10, located inside the silo 2, at the discharge mouth 7, in the way that will be better described below.

The scraper member 10 is placed at the discharge mouth 7, at a predetermined distance.

The scraper member 10 can be placed at a distance of a few millimeters above the lying plane of the discharge mouth 7, which is not shown in the attached figures.

According to a version of the invention, between the lower portion of the scraper member 10 and the aforementioned lying plane identified by the discharge mouth 7, a separation distance of about one millimeter is present.

The scraper member 10 determines a controlled displacement action of the material towards the discharge mouth 7, facilitating its exit from the dosing unit 1 according to pre-established methods and preventing the formation of clumps, with particular reference to materials such as powders, flours, etc.

The scraper member 10 is operationally connected to the extraction auger 8 as better described below.

The scraper member 10 can be activated selectively in rotation in order to keep the portion of the silo 2 at the discharge mouth 7 free, thereby avoiding undesired accumulation or clogging of the same by the material to be delivered.

Figure 9:
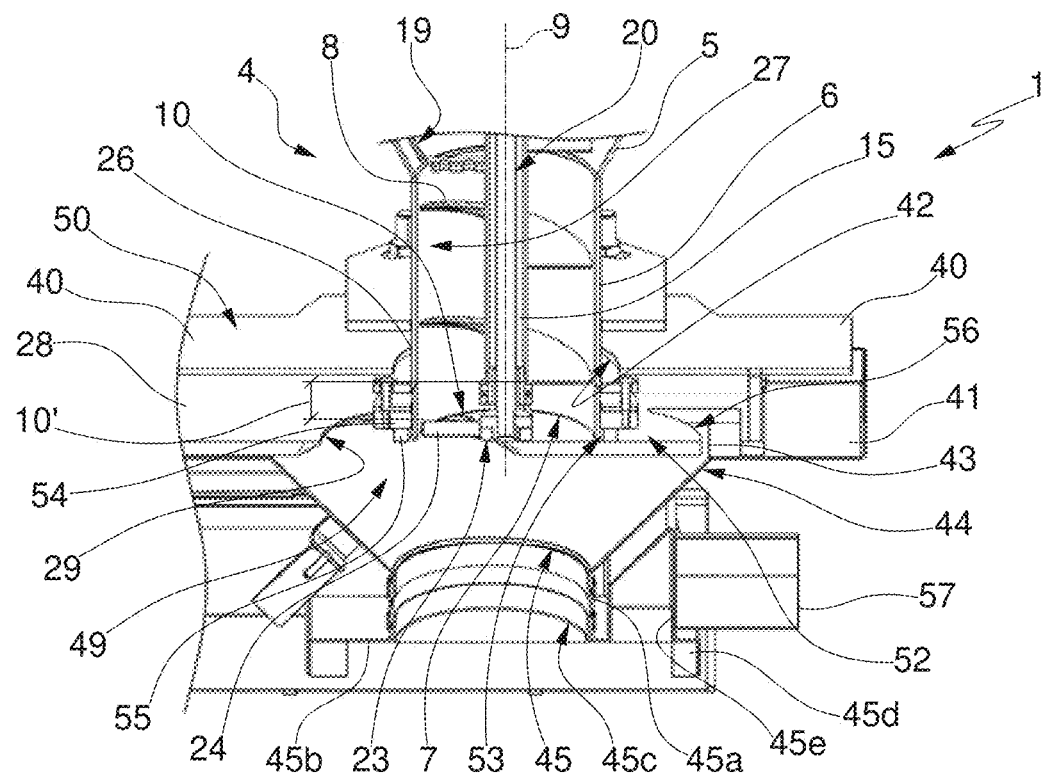
FIG. 9 is a side section view of a detail in an enlarged scale of the dosing unit according to the invention.

There is a distance 10' between the terminal lower end portion of the extraction auger 8, which in use is proximal to the discharge mouth 7 and the scraper member 10, which defines the working area of the scraper member 10 (see FIG. 9).

In practice, when the extraction auger 8 is stopped, the movement of the material advancing towards the discharge mouth 7 is interrupted.

During this step, the material is supported by the extraction auger 8.

By activating only the scraper member 10 in rotation, with the extraction auger 8 stopped, a controlled discharge of the material present in the volume of the hopper 5 to be found between the lower end of the extraction auger 8 and the scraper member 10 itself can be determined.

The dosing unit 1 comprises first actuation means 11 to selectively actuate the extraction auger 8 in rotation around the vertical axis 9.

Preferably, the first actuation means 11 are provided externally to the silo 2, so that they are easily accessible and this facilitating their possible maintenance.

In particular, the first actuation means 11 are provided at the upper portion 3 of the silo 2.

The dosing unit 1 comprises second actuation means 12 suitable for actuating the scraper member 10 in rotation. In particular, the scraper member 10 can be selectively operated in rotation about the vertical axis 9, as better indicated below.

Preferably, the second actuation means 12 are positioned outside the silo 2, at the upper portion 3, for the same purposes described in relation to the first actuation means 11.

The connection of the first actuation means 11 and of the second actuation means 12 to the upper portion 3 of the silo 2 can take place according to methods known in the field.

The first actuation means 11 and the second actuation means 12 can be operated independently of each other. Consequently, the extraction auger 8 can be actuated in rotation around the vertical axis 9 independently from the scraper member 10, this resulting in high versatility in the precise and controlled dosage of the material to be delivered.

The dosing unit 1 comprises at least one shutter component 13 positioned below the silo 2, at the lower end 6 thereof.

More precisely, the at least one shutter component 13 is provided below the discharge mouth 7.

As will be better described below, by varying the position of the at least one shutter component 13 it is possible to vary the width of the opening of the discharge mouth 7 itself and, thus, the method of delivering the material leaving the silo 2.

According to a version of the invention, the at least one shutter component 13 is movable slidingly with respect to the discharge mouth 7 for taking various operating positions.

Further versions of the invention are possible, not shown in the attached figures, in which the at least one shutter component 13 is shaped like a diaphragm comprising portions mutually movable to vary the passage opening through the at least one shutter component 13 itself.

Other versions of the at least one shutter component 13 are possible, not shown in the attached figures, suitable for varying the useful passage opening for the material to be delivered through the discharge mouth 7.

As a matter of fact, the at least one shutter component 13 determines the closure, the complete or partial opening of the discharge mouth 7, thereby adjusting the flow of material to be delivered through it.

The dosing unit 1 comprises moving means 14 of the at least one shutter component 13.

The moving means 14 are configured to vary the relative positioning of the at least one shutter component 13 with respect to the discharge mouth 7.

The moving means 14 can in turn comprise at least one sensor for checking the operating position taken by the moving means 14 themselves.

The dosing unit 1 can comprise a control processing unit, not shown in detail in the attached figures; to the control processing unit are operatively connected, i.e. subordinated in their operation the first actuation means 11, the second actuation means 12, the moving means 14 in addition to any automatic weighing devices.

The latter can be operatively connected to the dosing unit 1 in such a way that when the pre-established weight of material inside the container is reached, they can automatically stop the rotation of the extraction auger 8 and/or of the scraper member 10.

Going into more detail of the construction characteristics of the dosing unit 1, the extraction auger 8 is wound on a hollow shaft 15 mounted for rotation inside the silo 2.

The hollow shaft 15 can be actuated in rotation around the vertical axis 9.

More precisely, the hollow shaft 15 has an upper section 16, a central section 17 and a lower section 18.

The upper section 16 comes out from the top of the silo 2 and is mechanically coupled to the first actuation means 11.

The central section 17 and the lower section 18 extend, instead, inside the silo 2.

In particular, at least the lower section 18 carries the extraction auger 8 (see FIG. 3).

The hollow shaft 15 is operationally connected to the silo 2 by means of rotating connections according to methods known in the field. By way of example, the hollow shaft 15 is supported at the opposite ends by means of bearing connections, designed to keep it in an aligned position along the vertical axis 9 and to allow it to be rotated around the latter.

The dosing unit 1 can comprise at least one stirrer component 19 which protrudes radially from the hollow shaft 15.

Preferably, the at least one stirrer component 19 can extend at the at least one central section 17 and/or the lower section 18 of the hollow shaft 15.

The at least one stirrer component 19 radially protrudes from the hollow shaft 15.

By way of non-limiting example, the at least one stirrer component 19 can be shaped as a blade element, if desired at least partially hollow, to determine a mixing action of the material stored inside the silo 2, thereby facilitating the same to go down towards the lower portion 3 of the silo 2 itself.

The at least one stirrer component 19 actually promotes the mixing of the material to be delivered, thereby avoiding that clumps or agglomerates, which would obstruct, at least partially, the discharge mouth 7, are formed in the material.

With reference to what is illustrated in the attached FIG. 3, the dosing unit 1 comprises two stirrer components 19 made as thread-like elements, among which a first stirrer component 19' is placed at the central section 17 of the hollow shaft 15 and a second stirrer component 19" is placed along the lower section 18 of the hollow shaft 15, section where the extraction auger 8 is also present.

The two agitator components 19 have a vertical or inclined portion which, in fact, is, in use, proximal to the internal walls of the silo 2.

It is understood that further versions comprising a greater or lesser number of agitator components 19, possibly positioned or configured in a different way with respect to what is above described or illustrated in the attached figures, are possible, although they same fall within the same inventive concept of the present invention.

The scraper member 10 is associated with the end of a rod 20.

In particular, the scraper member 10 is connected to the lower end, in use of the rod 20.

The rod 20 is inserted through inside the hollow shaft 15 (see FIGS. 3 and 9).

The rod 20 is aligned with the vertical axis 9, likewise with the hollow shaft 15.

The scraper member 10 is operationally connected to the second actuation means 12 through the second rod 20. The latter can be operated in rotation around the vertical axis 9 independently from the hollow shaft 15.

The rod 20 has an overall length greater than that of the hollow shaft 15, so as to extend beyond the opposite ends of the latter.

More in detail, the rod 20 has an upper end 21, which protrudes above the hollow shaft 15, and a lower end 22 which extends inferiorly beyond the hollow shaft 15 (see FIG. 3).

Similarly to what is described in relation to the hollow shaft 15, the rod 20 is supported by means of rotating connections at both its ends, upper end 21 and lower end 22.

The upper end 21 protrudes beyond the hollow shaft 15, and therefore outside the silo 2, and is operationally connected to the second actuation means 12.

The scraper member 10 is instead provided at the second end 22.

Following the actuation in rotation of the rod 20 around the vertical axis 9, the consequent actuation in rotation of the scraper member 10 around this axis is determined.

The scraper member 10 comprises a central annular portion 23, inserted along the rod 20 and fixed to the same by screws. At least two radial fins 24 are integral with the central portion 23.

As said, the silo 2 comprises a lower portion 4 shaped as a hopper 5. In particular, the hopper 5 comprises a funnel conveyor portion 25 followed by a discharge portion 26, at the free lower end portion 6 of the silo 2.

Therefore, the discharge portion 26 is cylindrically shaped and delimits a work surface 27 inside it.

The extraction auger 7 extends along at least the lower section 18 of the hollow shaft 15 so as to engage at least the discharge portion 26 of the hopper 5, for almost the entire length of the same.

The internal diameter of the discharge portion 26 is dimensioned relative to the external diameter of the extraction auger 8 so that between the extraction auger 8 and the working surface 27, inside the discharge portion 26, a tight or substantially tight coupling is obtained.

Therefore, along the discharge portion 26 a controlled advancement of the material to be delivered at the outlet of the silo 2 is determined.

As said, the dosing unit 1 comprises at least one shutter component 13.

More in detail, with reference to the embodiment illustrated in the attached figures, the at least one shutter component 13 comprises at least one septum 28 which can be moved with respect to the discharge mouth 7.

According to a version of the invention, the at least one septum 28 is shaped like a flat sheet-like element. The at least one septum 28 has at least one through opening 29 which can be selectively faced to the discharge mouth 7 to vary the passage opening at the outlet from the dosing unit 1.

With reference to the embodiment illustrated in the attached figures, the at least one septum 28 is operatively connected to the moving means 14 to be moved relative to the discharge mouth 7.

As a matter of fact, if one moves the at least one septum 28 with respect to the discharge mouth 7 the relative position between the latter and the at least one through opening 29 varies.

With reference to the embodiment illustrated in the attached figures, the moving means 14 can comprise at least one linear actuator 30 suitable for shifting the at least one septum 28 along a horizontal direction 31 (see FIGS. 1 and 3).

By way of not limitative example, the at least one linear actuator 30 can be an electric, electro-mechanical, pneumatic actuator or in general an actuator suitable for controlling and adjusting the positioning of the at least one septum 28 along the direction 31.

According to a version of the invention, the at least one through opening 29 has at least a first circularly shaped portion 32.

In particular, the primitive diameter of the at least one first portion 32 is substantially equal to that of the discharge mouth 7.

The expression "primitive diameter" means the diameter of a circumference that circumscribes the first portion 32.

According to a version of the present invention, the at least one septum 28 has a second occluding portion 33, which extends within the overall bulk of the at least one through opening 29.

As a matter of fact, this second portion 33 determines a partial occlusion that connects two points along the edge of the at least one through opening 29.

In practice, the second occlusion portion 33 identifies an obstruction delimited between a chord 34 along the at least one through opening 29 and a section of the primitive circumference that circumscribes the at least one through opening 29.

It is further observed that the at least one septum 28 can have a shaped notch 35 along the second portion 33. The shaped notch 35 is made passing through the at least one septum 28, thereby defining a passage for the material to be delivered through the at least one septum 28, when the shaped notch 35 faces the discharge mouth 7.

With reference to the version illustrated in the attached figures, the shaped notch 35 is made centrally along the second portion 33.

More precisely, the shaped notch 35 can be made centrally along the chord 34 of the second portion 33.

Figure 4:
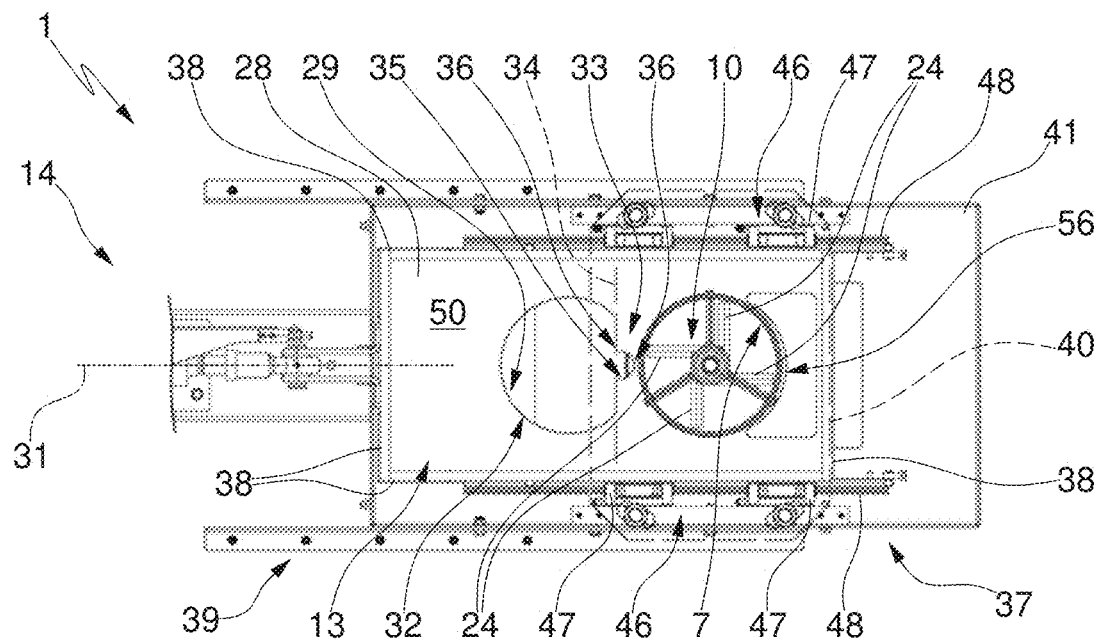
FIGS. 4 to 7 are top views of some operating positions that can be taken by some components included in the dosing unit according to the invention.

In practice, the shaped notch 35 is included within the second portion 33, between the first portion 32 and the primitive circumference of the at least one through opening 29 (see FIG. 4).

The shaped notch 35 can therefore have one end 36 which extends in the at least one through opening 29 and an opposite end 36' circumscribed within the primitive circumference of the through opening 29. Therefore, when the at least one through opening 29 faces towards the inside of the bulk in plan of the discharge mouth 7, even the shaped notch 35 is included inside the bulk in plan of the discharge mouth 7.

If required, it is possible to move the at least one septum 28 so as to bring only the shaped notch 35 facing the discharge mouth 7, thereby allowing the controlled delivery of small quantities of product.

It is observed that the shaped notch 35 can have further conformations with respect to that illustrated in the attached figures, for example with a greater or lesser width, even in the context of a solution in which the area in plan of the shaped notch 35 is less than the area in plan of the at least one through opening 29.

According to a version of the present invention, the dosing unit 1 comprises a drawer structure 37 operatively associated with the moving means 14. With reference to what has been previously described, it can be observed that the at least one septum 28 can be the bottom wall of this structure drawer 37.

The drawer structure 37 has containment side walls 38 which are operationally connected to the at least one septum 28.

The side walls 38 perimetrically delimit the at least one septum 28.

Preferably, the side walls 38 can be provided at the perimeter portion of the at least one septum 28.

The drawer structure 37 is slidably associated with a support structure 39 fixed with respect to the silo 2.

According to a version of the present invention, also the moving means 14 can be connected to the support structure 39, for example overhanging.

The support structure 39 comprises at least one first horizontal shelf 40, above the drawer structure 37, and a second horizontal shelf 41, below the drawer structure 37.

The first horizontal shelf 40 acts as a cover for the drawer structure 37, to avoid the dispersion of dust coming from the passage of the material delivered through the discharge mouth 7.

The second horizontal shelf 41 acts instead as a support along which the drawer structure 37 can slide.

Figure 2:
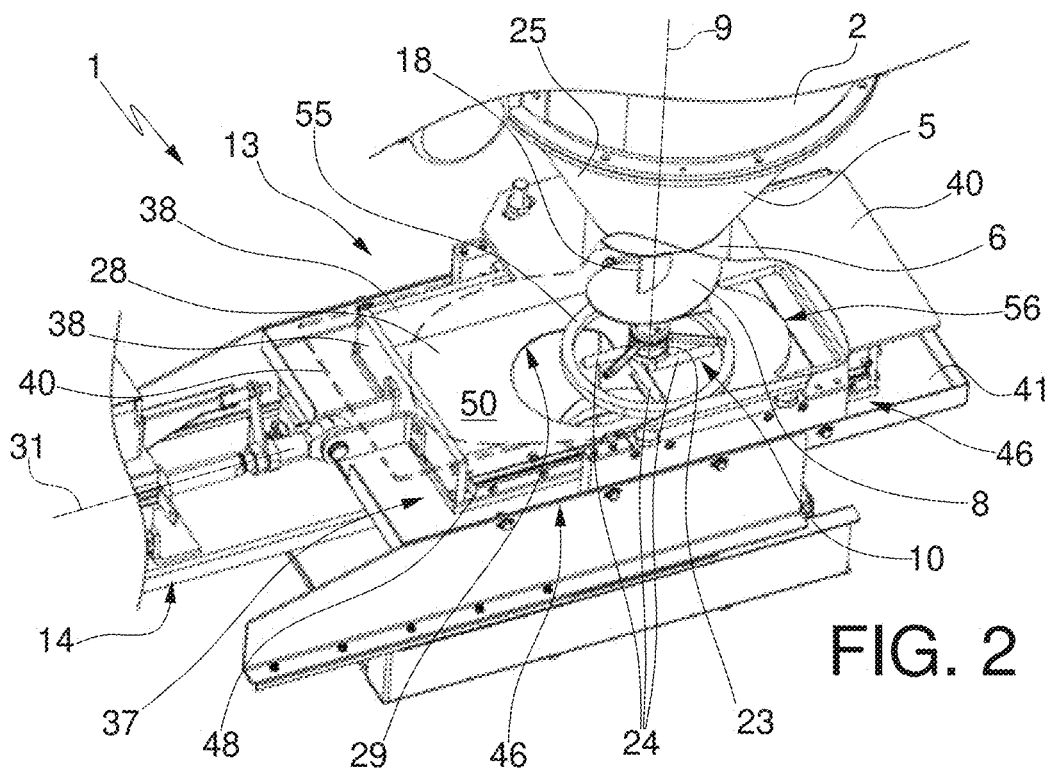
FIG. 2 is a perspective view of a detail of some components of the dosing unit of FIG. 1.

The first horizontal shelf 40 has a circular opening 42 that can be engaged from the free lower end 6 of the hopper 5 (see FIG. 2).

The second horizontal shelf 41 has a hole 43 for the passage of the material delivered through the discharge mouth 7.

According to a version of the present invention, the dosing unit 1 can comprise a conveying element 44 connected to the second horizontal shelf 41.

The conveying element 44 extends below the second horizontal shelf 41.

The conveying element 44 is tapered shaped, it is similar to a funnel, to convey the material delivered from the discharge mouth 7 towards a delivery mouth 45 with which a container not shown in the attached figures, can be associated, for the collection of the quantity of material delivered in a controlled way.

A bellows or an annular gate component 45a, for example ending in a plate 45b delimiting a main hole 45c aligned and with dimensions approximately equal to the lower end of the bellows 45a and of the delivery mouth 45, can also be mounted under the delivery mouth 45 and starting from the lower edge thereof. An annular gasket or more gaskets 45d mounted on the surface of the plate 45b opposite to that of constraint of the bellows 45a to the delivery mouth 45 can then be provided. The plate 45b then delimits a second through opening 45e in fluid communication with suction means (not shown in the figures), for example by means of a suction duct 57 which will also be discussed below.

The trim or position of the bellows or annular gate component 45a can be controlled in position and more particularly movable, by means of a respective actuator or controller, between an extended or elongated position and a retracted or shortened position.

More specifically, during an initial dosing step, during which the product or material is delivered at high speed or flow rate, with the suction means activated, the bellows or annular gate component 45a is operated and arranged in an extended position or elongated, so as to bring it into contact, directly or by means of the plate 45b, with the bag or container in which the product is deposited, so that the product or material is delivered within the container and the thus produced powders are entirely sucked by the suction means, since the bellows or annular gate component 45a prevent the powders from being dispersed between the delivery mouth 45 and the underlying container.

In the final dosing step, during which the product or material is delivered at low speed or flow rate so as to convey the residual or final quantity of product, the bellows 45a is instead raised or brought to the retracted position so as not to distort the weighing, since otherwise the scale on which the container rests would detect a weight also conditioned by the presence of the bellows 45a.

As will be understood, the bellows or annular gate component 45a is designed to avoid the dispersion of the powders during the dosing into the environment, in particular during an initial dosing step, while during the final dosing step, since the speed or flow rate of conveying the product or material is low, there is no risk of dispersion of product powders, so that the bellows or annular gate component 45a can also be in the retracted position.

The dosing unit 1 can comprise guide means 46 of the drawer structure 37.

The guide means 46 can be configured as linear sliding guides to guide the movement of the drawer structure 37 along the second horizontal shelf 41.

According to a version of the invention illustrated in the attached figures, the guide means 46 comprise fixed elements 47 and mobile elements 48 operatively connected to each other. More in detail, the fixed elements 47 can be connected to one between the second horizontal shelf 41 and the outside of the side walls 38 of the drawer structure 37 parallel to the horizontal direction 31, while the mobile elements 48 can be connected to the other between the outside of the side walls 38 and the second horizontal shelf 41.

The dosing unit 1 comprises means for cleaning the at least one septum 28 indicated as a whole with 49.

The cleaning means 49 are configured to keep the upper, in use, surface 50 of the at least one septum 28 clean.

In particular, the cleaning means 49 are configured to remove any material exiting the discharge mouth 7 which is deposited on the upper surface 50 of the at least one septum 28.

With reference to the embodiment illustrated in the attached figures, the cleaning means 49 comprise at least one brush component 51 operatively connected to the discharge mouth 7.

Figure 8:
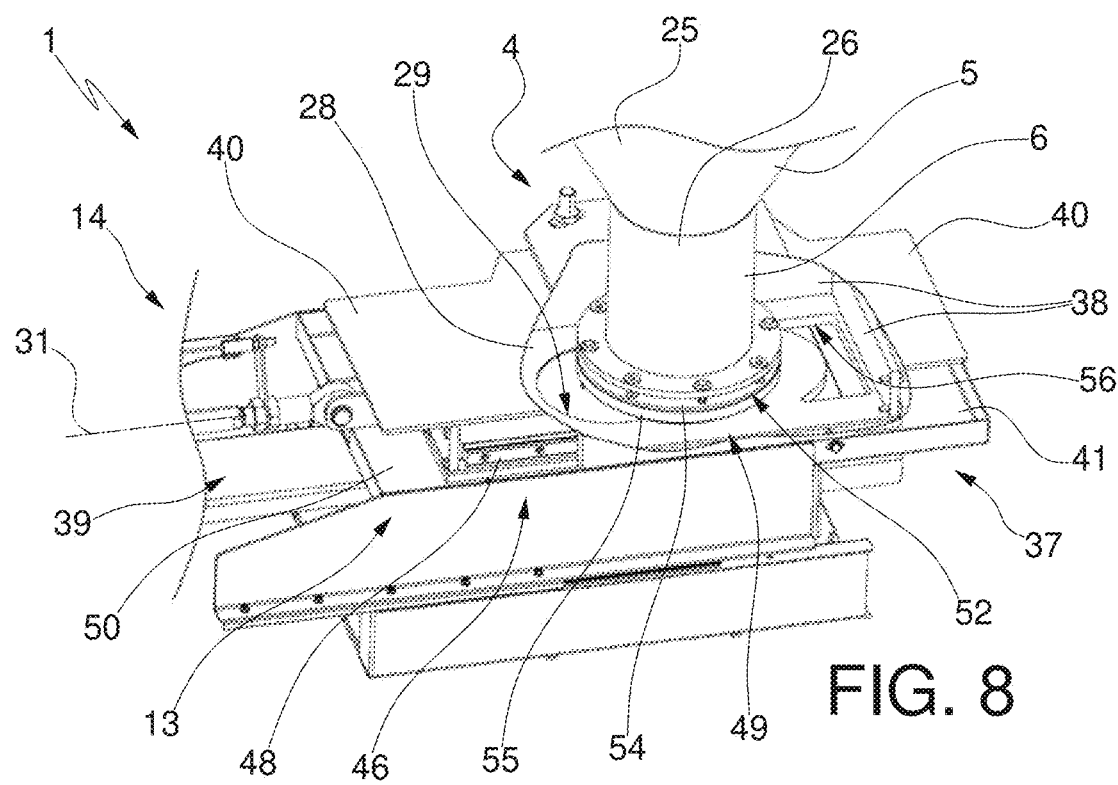
FIG. 8 is a perspective view of a detail of the dosing unit according to the invention.

More precisely, the at least one brush component 51 is connected to the free lower end 6 of the hopper 5 via a flanged connection 52 (see FIGS. 3, 8 and 9) according to methods known in the sector, which will therefore not be described in detail.

Preferably, the at least brush component 51 is configured annular and has an internal diameter 53 greater than the diameter of the discharge mouth 7 so as not to interfere with the discharge of the material to be delivered from the silo 2.

The brush component 51 comprises a support portion 54 and a cleaning portion 55 connected to each other.

The support portion 54 and the cleaning portion 55 can be connected removably or permanently to each other.

The support portion 54 can be made of rigid material, for example metal, a metal alloy or a polymeric material, such as POM-C (Polyoxymethylene copolymer), to provide a stable and firm support for the connection of the brush component 51 to the flanged connection 52.

The cleaning portion 55 can be made of nylon 6/6.

The cleaning means 49 also comprise at least a second through opening 56, which extends through the at least one septum 28.

The second through opening 56 is spaced from the at least one through opening 29 so as not to interfere with it during the material delivery step from the discharge mouth 7 of the silo 2.

Figure 6:
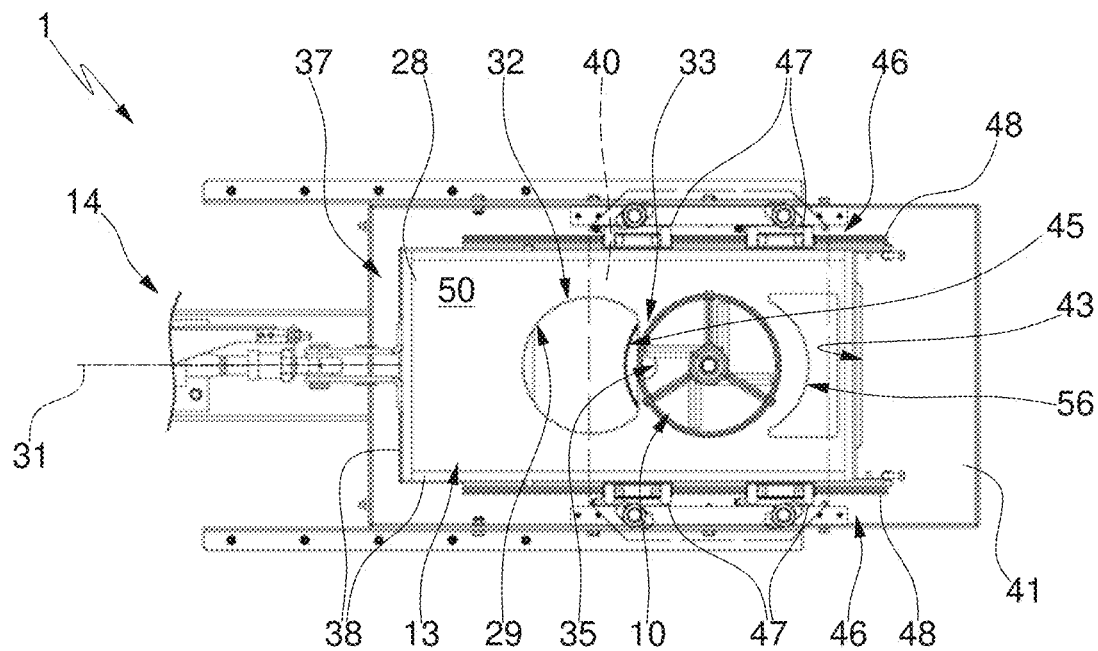

Actually, the second through opening 56 is positioned along the at least one septum 28 in such a way that by moving the same in the occlusion position of the discharge mouth 7 (see FIGS. 4 and 6) the second through opening 56 is brought close to the at least one brush component 51.

The second through opening 56 is made along the at least one septum 28 so as to selectively face the conveying element 44.

According to a version of the invention, the second through opening 56 can have at least a portion complementary to a portion of the at least one brush component 51 (see FIG. 4). It is understood that further shapes of the second through opening 56 are possible, which are also capable of allowing the fall of excess material present along the upper surface 50, without any limitation.

The at least one brush component 51 is configured in such a way that the cleaning portion 55 is in contact with or substantially in contact with the upper surface 50 of the at least one septum 28. Possible material delivered by the discharge mouth 7 and deposited along the upper surface 50 of the at least one septum 28 is then pushed by the cleaning portion 55 towards the second through opening 56 until it falls along the conveying element 44.

According to a version of the invention, the conveying means 44 can be operatively connected to suction means, not shown in the attached figures, to draw any excess material accumulated along the upper surface 50 of the at least one septum 28.

By way of example, the dosing unit 1 can comprise a suction duct 57 in fluid communication with the internal volume of the conveying element 44. The suction duct 57 can be operatively connected to the suction means so as to draw any excess material present along the upper surface 50 of the at least one septum 28 and pushed near the second through opening 56 by means of the action of the cleaning portion 55.

The dosing unit 1 according to the present invention can comprise one or more vibrating means 58 operatively connected to the silo 2, on the outside of the latter, to promote the sliding of the material fed inside the silo 2 itself towards the discharge mouth 7 and prevent the adhesion of this material to the internal walls of the silo 2 from occurring.

The operation of the previously described dosing unit 1 according to the invention is briefly described below.

The method of dispensing a material by means of the dosing unit 1 includes a step of supplying the material to be dosed inside the silo 2.

Then, the first actuation means 11 of the extraction auger 8 are activated at a first rotation speed, and for an interval of time necessary to extract the necessary quantity of material.

These operating parameters are calculated and chosen based on the characteristics of the auger, i.e. for example its main size, as well as on the basis of the characteristics of the material to be delivered.

The extraction method also comprises a step of activating the second actuation means 12 of the scraper member 10 at a second rotation speed.

This last step can be performed for an interval of time which coincides with that of activation of the first actuation means 11, or for a different interval of time, in relation to specific needs.

By way of example, the second actuation means 12 can be activated after the first actuation means 11, with a time delay calculated in relation to the specific application.

The method also includes a step of stopping the first actuation means 11 and performing at least one final rotation of the scraper member 10.

During the activation of the first actuation means 11 and/or of the second actuation means 12, the moving means 14 can control the translation of the at least one septum 28 in order to vary the passage opening through the discharge mouth 7.

Figure 5:
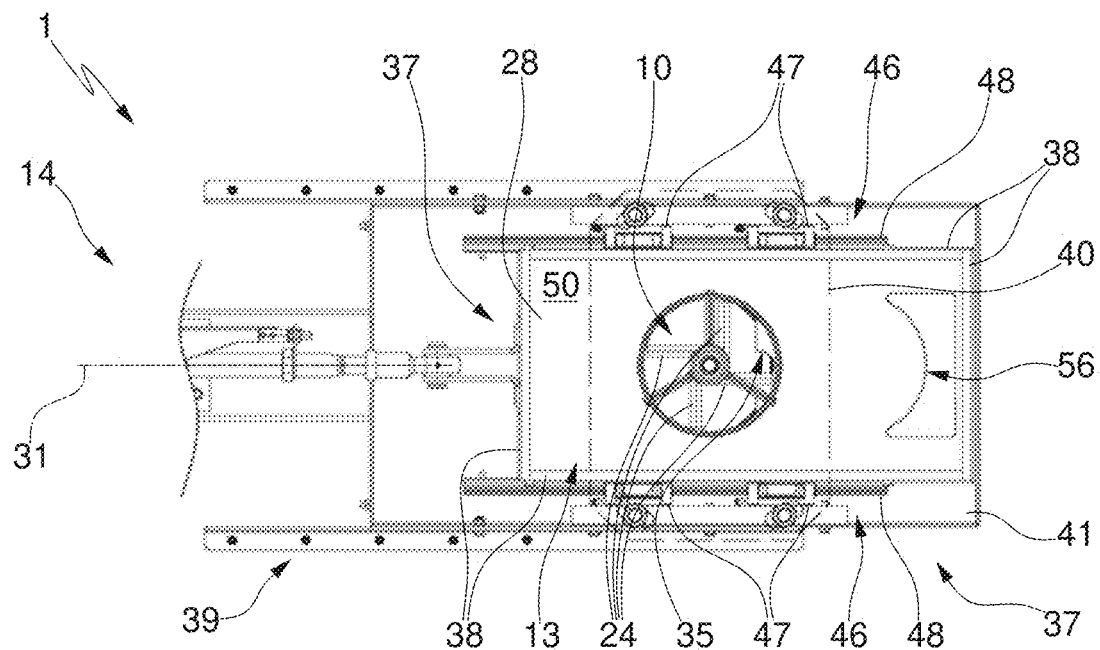

If it is necessary to delivery huge amounts of product in a reduced time interval, the at least one septum 28 can be moved to the maximum opening position (see FIG. 5). Alternatively, if it is necessary to partialize the material outlet section through the discharge mouth 7, the at least one septum 28 can be moved in one of the intermediate positions between that of maximum opening (see FIG. 5) and that closing (see FIG. 4).

Figure 7:
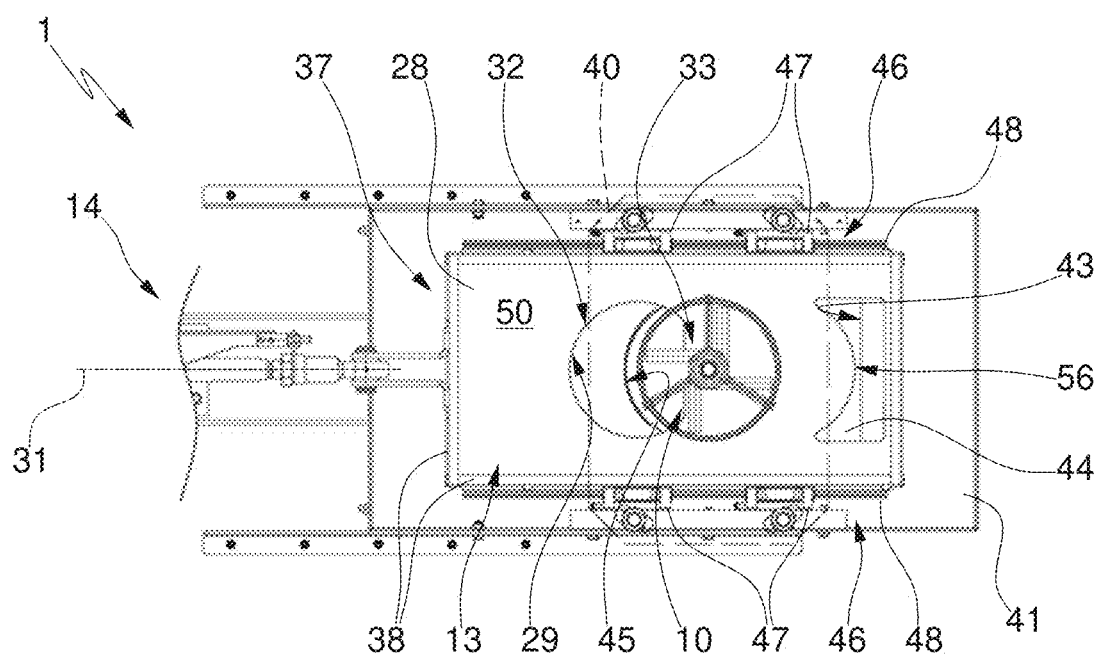

For example, the at least one septum 28 can be moved to an intermediate position, in which only the shaped notch 35 faces the discharge mouth 7 (see FIG. 6) or in a further intermediate position in which both the shaped notch 35 and part of the at least one through opening 29 face the discharge mouth 7 (see FIG. 7).

If, following the partial occlusion of the discharge mouth 7 on the upper surface of the at least one septum 28, material delivered in excess to be removed is deposited, the moving means 14 can be activated so as to facilitate the removal of this material.

In particular, the moving means 14 can move the at least one septum in such a way as to bring the second through opening 56 near the discharge mouth 7, to allow the cleaning means to remove this excess material.

The at least one brush component 51 pushes any excess material present on the upper surface 50 towards the second through opening 56 until it determines the fall of the material itself through the second through opening 56 itself.

The cleaning means 49 therefore allow to free the upper surface 50 of the at least one septum 28 to prepare the dosing unit 1 in optimal conditions to proceed with a subsequent controlled and precise delivery of material.

With reference to the above, it is evident that the dosing unit 1 according to the invention is capable of achieving the intended objects.

The dosing unit 1 in fact makes it possible to act on different parameters to control the delivery of the material located inside the silo 2.

In fact, it is possible to vary and control the speed and time of actuation in rotation of the extraction auger 8, of the scraper member 10 or the position taken by the at least one septum 28 relative to the discharge mouth 7 in a precise manner, determining the delivery of the exact pre-established quantity of material.

The operational flexibility of the dosing unit 1 according to the invention makes it possible to use a plurality of dosing groups 1 along an automatic weighing system regardless of the shape and characteristics of the material to be delivered.

Therefore, such a weighing system is extremely flexible as it is not necessary to equip specific dosing units according to the characteristics of the material to be delivered.

In fact, it is sufficient to provide a plurality of dosing units 1 according to the invention and adjust their operating parameters according to the shape and characteristics of the material to be delivered.

The dosing unit 1 according to the invention renders it possible the controlled delivery of even minimum quantities of material and to optimize operating times, always maintaining a high precision and repeatability of the operation.

Moreover, as it will be possible to ascertain, with respect to the solutions according to the state of the art, a dosing unit according to the present invention allows to obtain a considerable energy saving as a function of the reduction of the dosage times. In this regard, since, compared to the dosing units proposed so far, the activation time of the actuation means is reduced, an optimization of the use of power is obtained, while guaranteeing lower energy consumption.

Furthermore, if a bellows or an annular gate component 45a is provided, thanks to the present invention a reduction of the dispersion of the powders in the environment during the dosage would be obtained, in particular during an initial dosage step.

The above described dosing unit 1 is susceptible of numerous modifications and variations within the scope of the claims that follow.

The invention claimed is:

1. A dosing unit, for the controlled delivery of a solid material, comprising a silo for containing the material to be delivered, having on the bottom a discharge mouth, said discharge mouth being circular, at least one extraction auger arranged inside said silo and operable in rotation around a vertical axis, at least one scraper member, located inside said silo and associated with said discharge mouth operable in rotation around said vertical axis, first actuation means of said extraction auger and second actuation means of said scraper member, at least one shutter component positioned below said discharge mouth, moving means operatively connected to said at least one shutter component to determine the closure, the complete or partial opening of said discharge mouth and to adjust the flow of said material to be delivered.

2. The dosing unit according to claim 1, wherein said shutter component is external to said silo and comprises at least one septum having at least one through opening selectively facing on said discharge mouth.

3. The dosing unit according to claim 2, wherein said at least one through opening has at least a first portion shaped as a circle for at least a segment, with a diameter being substantially equal to the diameter of said discharge mouth.

4. The dosing unit according to claim 3, wherein said at least one septum has a second portion of occlusion which develops inside the bulk in plan of said at least one first portion, wherein said second portion determines an occlusion which connects two points along the edge of said first portion, identifying a chord along said at least one through opening.

5. The dosing unit according to claim 4, wherein said at least one septum has a shaped notch made centrally along said second portion, wherein said shaped notch develops passing through said at least one septum.

6. The dosing unit according to claim 1, wherein said extraction auger is wound on a hollow shaft mounted for rotation inside said silo and said scraper member is associated with the end of a rod inserted passing through said hollow shaft.

7. The dosing unit according to claim 6, comprising at least one stirrer component extending radially from said hollow shaft, wherein said stirring component is configured as a full or at least partially hollow blade or as a shaped thread-like element.

8. The dosing unit according to claim 1, wherein said at least one septum is the bottom wall of a drawer structure operatively connected to said moving means.

9. The dosing unit according to claim 8, wherein said drawer structure is slidably associated with a supporting structure, wherein said supporting structure is fixed with respect to said silo.

10. The dosing unit according to claim 9, wherein said supporting structure comprises a first horizontal shelf arranged above said drawer structure and a second horizontal shelf arranged below said drawer structure.

11. The dosing unit according to claim 10, wherein said second horizontal shelf has a hole for the passage of the delivered material through said discharge mouth and a conveying element, extending below said second horizontal shelf, designed to convey said delivered material towards a delivering mouth to which a collection container can be associated.

12. The dosing unit according to claim 1, comprising cleaning means for cleaning an upper surface of said at least one septum.

13. The dosing unit according to claim 12, wherein said cleaning means comprise at least one brush component operatively connected to said free lower end of said hopper through a flanged connection.

14. The dosing unit according to claim 1, wherein said at least one septum comprises a second through opening spaced from said at least one through opening, suitable to be placed selectively close to a brush component to allow the fall and therefore the removal of any excess material along said upper surface of said at least one septum by means of said brush component.

15. The dosing unit according to claim 11, wherein under the delivering mouth and starting from the lower edge thereof a bellows or an annular shutter component is mounted terminating in a plate delimiting a main hole aligned and having approximately the same size as the lower end of the bellows and of the delivering mouth, said plate delimiting a second through opening in fluid communication with suction means, and wherein the arrangement or position of the bellows or annular gate component can be controlled in position and movable by means of a respective actuator or controller, between an extended or elongated position and a retracted or shortened position.

* * * * *